Feb. 23, 1960

R. S. SANFORD 2,925,891

DAMPING MECHANISM

Filed June 8, 1956

INVENTOR
ROY S. SANFORD.

BY *Scrivener & Parker*

ATTORNEYS

Feb. 23, 1960　　　R. S. SANFORD　　　2,925,891
DAMPING MECHANISM

Filed June 8, 1956　　　　　　　　　　　4 Sheets-Sheet 4

INVENTOR
ROY S. SANFORD
BY Scriven & Parker
ATTORNEYS

United States Patent Office 2,925,891
Patented Feb. 23, 1960

2,925,891

DAMPING MECHANISM

Roy S. Sanford, Woodbury, Conn., assignor to Roy S. Sanford, Woodbury, Roger H. Casler and James O. Eames, Washington, and Wilfred A. Eaton and Erling D. Sedergren, Woodbury, Conn.

Application June 8, 1956, Serial No. 590,149

2 Claims. (Cl. 188—152)

This invention relates to damping devices for fluid pressure circuits or devices, and more particularly to damping devices for fluid pressure circuits or devices of the type adapted to be subjected to sudden pressure fluctuations of fluids or liquids supplied thereto or passing therethrough. Although such dampeners are adapted for the purpose of minimizing or preventing vibration or noise in such circuits and devices resulting from sudden pressure fluctuations, the damping devices to be described hereinafter are particularly well adapted for use in hydraulically operated brake mechanisms of the type to be more fully described hereinafter.

Accordingly, one of the primary objects of the invention is to provide a damping device for hydraulically operated brake mechanisms, so constituted as to prevent sudden pressure fluctuations of the hydraulic fluid supplied to the brake from detrimentally affecting the control of the brake mechanism by the operator.

Another object of the invention is to provide a dampener for damping sudden pressure fluctuations in fluid circuits or fluid operated devices, so constituted as to be relatively simple in construction, and easily and economically manufactured.

A further object of the invention is the provision of a dampener device of the above type wherein only a single resilient dampening element is necessary.

A still further object of the invention is to provide a simple and novel method of preventing so-called "water hammer" in pipe lines having valves so constituted as to suddenly reduce or stop the flow of an hydraulic fluid in said pipe lines.

The use of air domes associated with hydraulic pipe lines for the purpose of preventing or minimizing "water hammer" is well known, these domes comprising an air chamber connected with the hydraulic line in such a manner as to form an air cushion which is compressible and expandable in response to fluctuations of pressure in the pipe line. In the operation of such air domes, however, it has been found that the hydraulic liquid, which in many cases is water, tends to absorb air from the air dome, thus tending to change the characteristics of operation of the air dome and require replenishment of the air therein at periodic intervals. It is accordingly another object of the invention to provide a means and method of introducing into an hydraulic circuit or device, a compressible air or gas cushion wherein the amount of compressible air or gas in the system subjected to the action of the liquid will remain substantially constant for an indefinite period.

Another well known damping device for such circuits of the above character comprises a piston subjected on one side to the action of the hydraulic liquid in the circuit or device, and on the other side to the action of a spring or to the action of compressed air. It has been found, however, that such devices are inadequate to damp out sudden pulsations efficiently due to the inertia and friction of the piston which prevents it from responding to such sudden fluctuations, and it is accordingly another object of the invention to provide resilient dampening means so constituted as to be almost instantaneously responsive to sudden pressure fluctuations in the system without any appreciable inertia effects occurring.

A still further object is the provision of a silencer mechanism adapted to minimize or eliminate noise caused by the flow of a pulsating stream of compressed gas flowing through a conduit.

These and other objects and features of the invention will be more fully understood when considered in the light of the following description and the accompanying drawings. It is to be specifically understood, however, that the drawings are utilized for purposes of illustration only, reference being had to the appended claims for a definition of the limits of the invention.

In the drawings, wherein similar reference characters are utilized to identify similar parts throughout the different views, Fig. 1 shows a type of hydraulically operated and liquid cooled brake mechanism particularly adapted to the use of the present invention;

As heretofore stated, the present invention has been found to be very effective in a particular type of hydraulic brake mechanism, and its construction and operation will therefore be described in connection with such a brake mechanism as shown in connection with Figs. 1 to 6 inclusive. Although the invention is adaptable to use with other types of brake mechanism, it has been found particularly adaptable to brakes of the liquid cooled type wherein a cooling liquid is circulated through the brake mechanism under pressure, and a pressure responsive element in the brake actuator is subjected to the pressure of the circulating cooling liquid for the purpose of actuating the brake mechanism.

Figure 1:
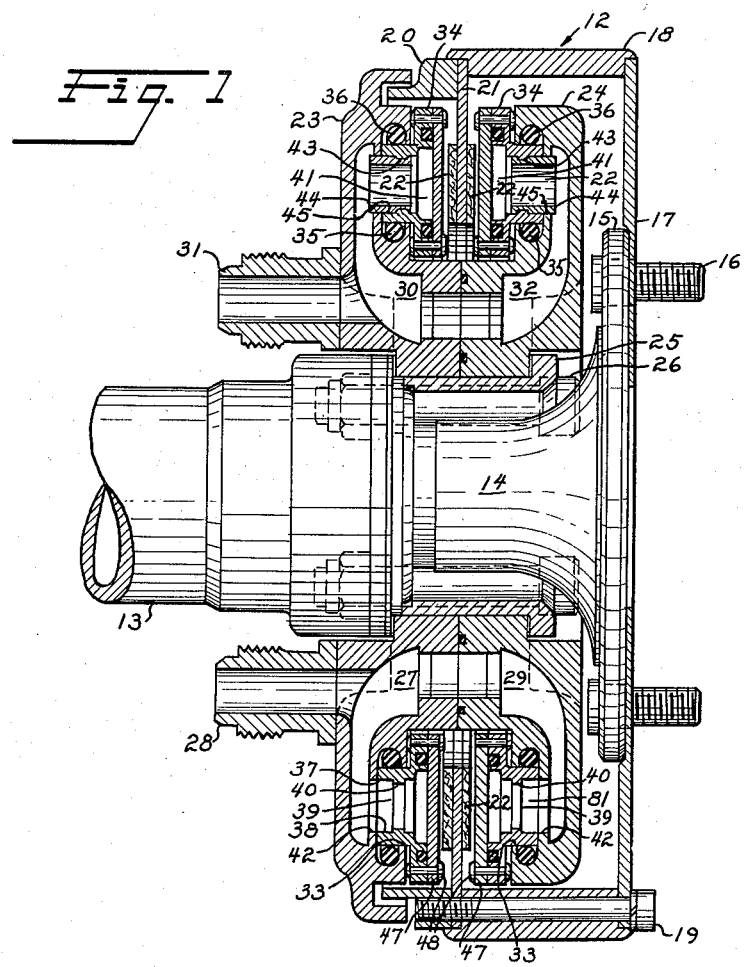

Referring first more particularly to Fig. 1, a brake actuator 12 is shown as applied to the rear axle of a vehicle which includes an axle housing portion 13, and a hub 14 mounted on an axle, not shown, rotatably mounted in the axle housing. A wheel supporting flange 15 is secured to the hub in any suitable manner and is provided with studs 16 adapted to receive a demountable wheel, not shown. A plate 17 is secured to the hub by means of the studs 16, and a rotatable brake housing 18 is secured to the plate 17 by means of cap screws 19. An additional rotatable annular member 20 is secured to the housing by means of the cap screws 19, and serves to clamp a rotatable brake lining plate 21 therebetween provided with annular friction lining discs 22 on either side thereof, these being secured thereto adhesively or otherwise, and preferably being made of a composition brake lining material having low heat conductivity. Thus, when the hub is rotated with the wheel of the vehicle, the lining plate and brake discs are rotated therewith.

A pair of stationary annular rigid brake actuator members 23 and 24 are secured to the axle housing 13 by means of a clamping member 25 and bolts 26 as shown. Member 23 is provided with an inlet passage 27 adapted to be supplied with a cooling liquid under pressure through a connection 28, the right end of the passage registering with a similar inlet passage 29 in the member 24. Referring to the upper part of Fig. 1, an outlet passage 30 is provided in the member 23, this passage being adapted to discharge liquid from the actuator through an outlet connection 31, the outlet passage 30 at its right end being connected with a similar outlet passage 32 in the member 24.

Annular cylinders 33 are formed in the members 23 and 24, and annular rigid pistons 34 are slidably mounted in said cylinders. Inner and outer annular sealing rings 35 and 36 are provided in both cylinders as shown for preventing leakage between the pistons and the cylinder walls, these rings being of rubber or other resilient material, and preferably of the O ring type. Thus, as will be more fully described hereinafter, pressure chambers are formed between each of the pistons and its corresponding cylinder. Each of said pistons are provided respectively with inner and outer annular ring portions 37 and 38, and since it is desirable that pistons be rigid, the annular ring portions are connected by annular webs or partitions 39, forming backwalls in each of the pistons. Referring to the lower part of the drawing, the annular partitions or backwalls 39 are provided with inlet ports 40 which communicate with channels 41 formed in the pistons. As shown in the drawing, the channels 41 in the opposed pistons are positioned adjacent the composition friction rings 22. Ports 42 in the members 23 and 24 serve to connect chambers 27 and 29 with the cylinders 33 formed in the members, the ports 40 in the pistons serving as the only connections between the chambers 27 and 29 and the channels 41 in the pistons.

Figure 4:
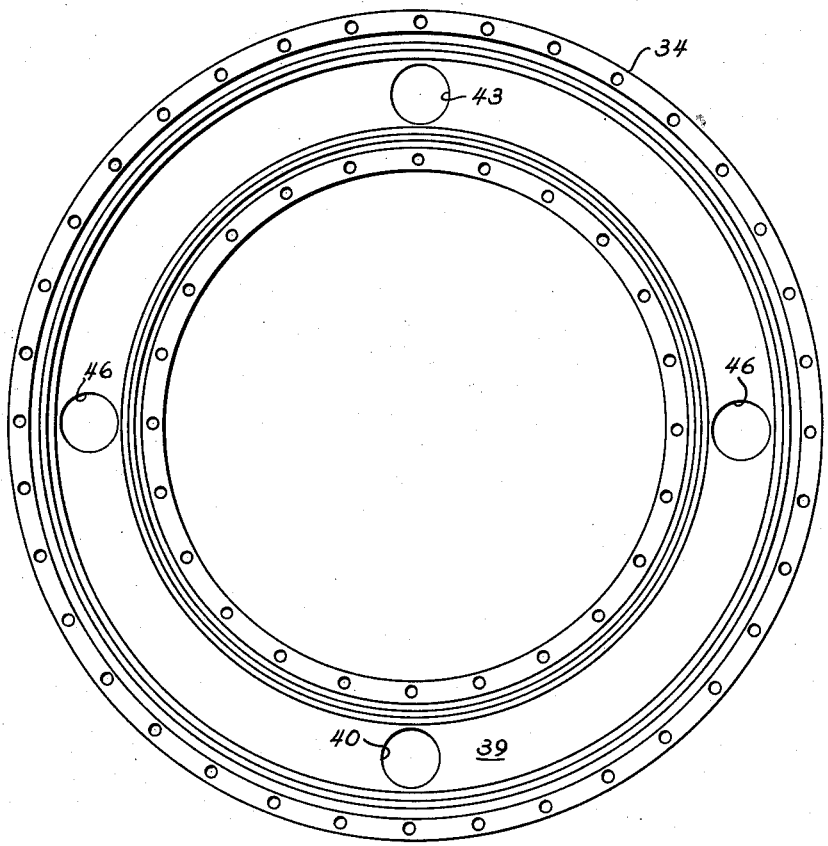
Fig. 4 is a front view of one of the pistons of the brake mechanism shown in Fig. 1.
Figure 5:
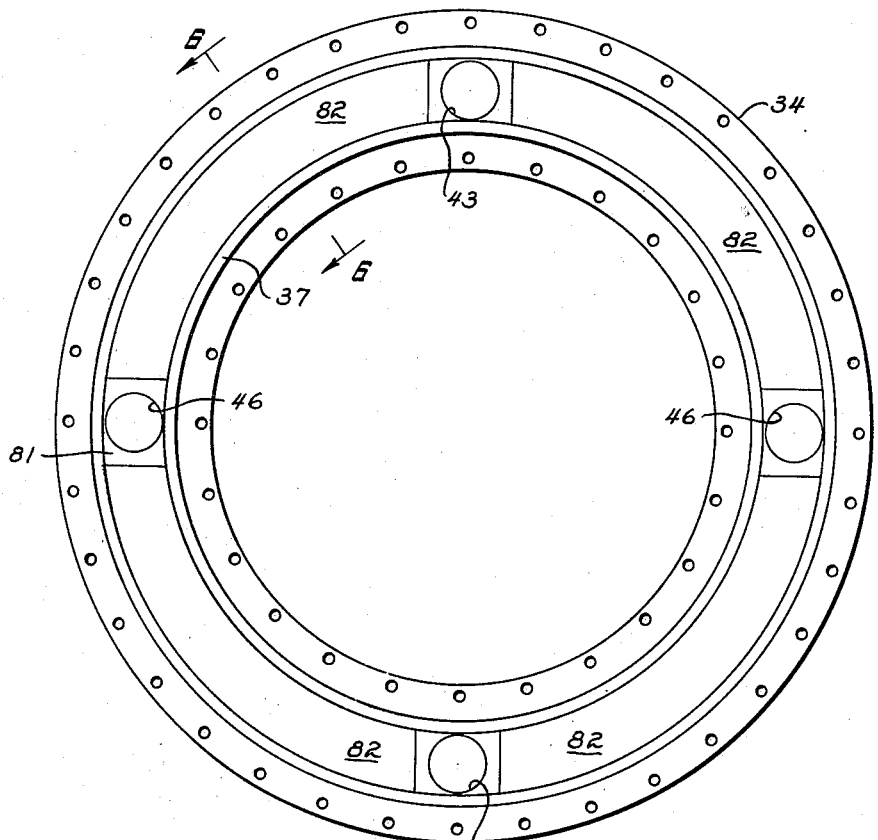
Fig. 5 is a back view of the piston shown in Fig. 4.

Referring now to the upper part of Fig. 1, the backwalls 39 of the pistons are provided with bores 43 having liquid flow directing devices or tubular dams 44 secured therein by swedging or by other suitable means, the outer ends of the tubular dams being slidable in bores 45 in the end walls of cylinders 33. The outer ends of these tubular dams serve to connect the channels 41 of the pistons respectively with the outlet passages 30 and 32 in the members 23 and 24, and at the same time prevent the flow of liquid between the cylinders and the outlet passages through the bores 45 in the backwalls of the cylinders. Referring to Figs. 4 and 5, showing the piston 34, it will be noted that the only openings in the back walls of the piston are the bores of ports 40 and 43, previously referred to, and bores 46 which are engaged by and closed by anchor pins, shown in Fig. 2 and to be described in detail hereinafter.

A thin annular metal friction plate 47 closes the outer end of the channel in each of the pistons, and is secured in sealing engagement with the ends of each piston as by means of rivets 48, it being noted that a large portion of each of the metallic friction plates is unsupported directly by the piston and is exposed to the flow of liquid in the channels 41. The open ends of the piston channels are of substantially the same area as and substantially in alignment with the annular composition friction rings 22, the area of the pistons acted on by fluid pressure is substantially identical with the areas of the open ends of the annular piston channels, and consequently, when the pistons are subjected to fluid pressure to effect engagement of the friction plates with the friction rings 22, the forces exerted on the pistons by the action of the fluid to effect such engagement is substantially identical with the forces exerted by the friction rings 22 in the opposite direction on the unsupported portions of the metallic friction elements, and there is therefore no tendency to distort the unsupported portions of the metallic friction elements which are subjected on one side to the force of the composition friction rings 22, and on the opposite side directly to the pressure of the cooling liquid which is circulated through the channels 41 of the pistons.

Figure 2:
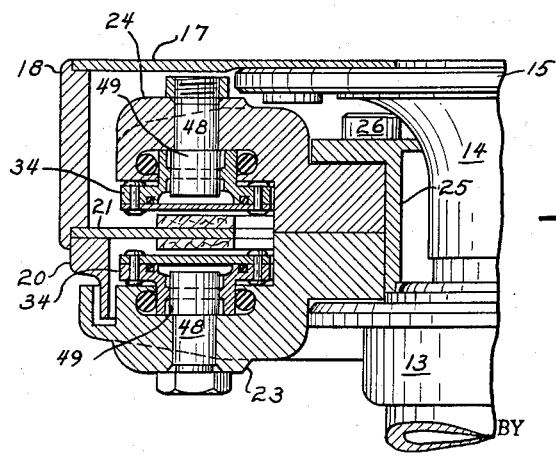
Fig. 2 is a view partially in section of another portion of the mechanism of Fig. 1.

Referring now to Figs. 2 and 4 more particularly, and assuming that Fig. 4 shows a view of the left hand piston 34 taken from the right as viewed in Fig. 1, it will be noted that an anchor pin 48 is secured to each of the members 23 and 24 as shown, and that the anchor pins have enlarged portions 49 positioned to slidably engage the bores 46 in the backwalls of the pistons, the anchor pins preferably being spaced approximately 90° from the ports or bores 40 and 43 in the pistons. A second pair of anchor pins is spaced 180° from the above pins. These anchor pins serve to take the torque of the pistons when the brake is applied, and at the same time serve to prevent the passage of cooling liquid through the bores 46 between the channels 41 and the pressure chamber formed between the pistons and backwalls of the cylinders.

Figure 3:
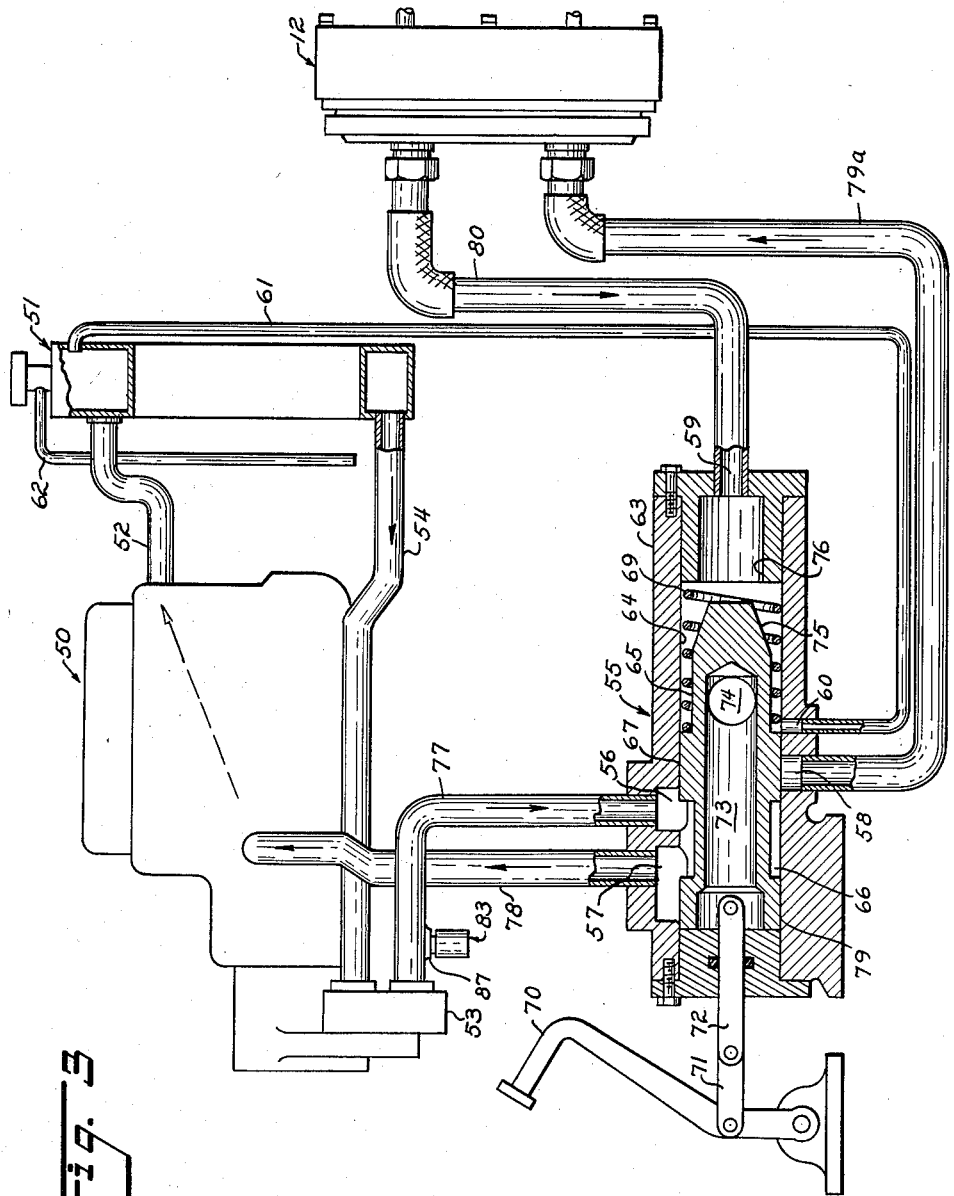
Fig. 3 is a diagrammatic view, partly in section, of a hydraulically operated and liquid cooled brake system adapted for use with the present invention.

Fig. 3 shows a system for supplying cooling liquid under pressure to the brake mechanism, and for controlling the flow and pressure of said liquid. This system includes an engine 50 provided with a cooling radiator 51, the upper portion of the radiator being connected to the upper portion of the water jacket of the engine by means of a conduit 52, and the lower portion of the radiator being connected to the inlet port of an engine driven pump 53 by means of a conduit 54, the pump being of a type giving a pulsating flow of liquid, such as for example a gear or vane pump of well known construction.

A control valve mechanism 55 is provided having an inlet port 56, an outlet port 57, a brake supply port 58, a brake return port 59, and a bleed port 60, the latter port being connected to the upper tank of the radiator by means of a conduit 61, and the upper tank of the radiator being vented to atmosphere by a conduit 62. The valve mechanism is provided with a housing 63 provided with a bore 64 and a spool valve 65 slidably mounted therein. The spool valve is provided with a groove 66 which normally serves to connect inlet and outlet ports 56 and 57 when the brake is in release position and a land 67 which serves normally to permit communication between the bore 64 and the vent conduit 61, and to prevent communication between the groove 66 and the brake supply port 58, the spool valve being normally maintained in the position shown by means of a spring 69, and operated by a brake pedal 70 through the medium of a link 71 and a rod 72. A bore 73 is provided in the spool, being open at its left end, and connected at its right end with the bore 64 to the right of the spool by means of a port 74. The right end of the valve is provided with a tapered valve portion 75 adapted on movement of the valve spool to the right to restrict or close the left end of a bore 76 at the right end of the valve which is connected with the brake return port 59.

When the brakes are released with the control valve parts in the position shown, the engine circulating pump draws liquid from the bottom of the engine radiator and circulates it back to the top of the radiator, all of the liquid passing through the control valve through the medium of a pump discharge conduit 77, inlet port 56, groove 66, outlet port 57, and a conduit 78 leading from the outlet port of the valve to the lower portion of the water jacket in the engine 50. In the event it is desired to apply the brakes, the spool valve is moved to the right, whereupon a land 79 on the left end of the valve spool restricts the flow of liquid back to the engine through the outlet port 57, while at the same time, the land 67 is operative to uncover the brake supply port 58, to allow a portion of the circulating liquid to flow to the brake actuator 12 through a conduit 79a, this liquid being returned from the actuator to the engine and radiator through a conduit 80, the brake valve return port 59, the bore 64 in the control valve, the port 74 in the spool, bore 73 in the spool valve, and thence through brake valve outlet port 57 and conduit 78. Hence it will be seen that in the event a sudden brake application is made, the flow of the cooling liquid passing through the brake valve from the inlet port 56 to the outlet port 57 is suddenly restricted, and the direction of flow is suddenly changed to pass a portion or all of this liquid to the brake actuator through the brake valve supply port 58, thus tending to cause a very sudden increase in pressure in the conduit 79a leading to the brake actuator, as well as a possible sudden increase of pressure in the supply conduit 77 leading from the pump to the brake valve. As the valve spool is moved to the right, the return of cooling liquid from the brake actuator to the engine through the brake return port 59 is progressively restricted, thus causing the pressure of the liquid in the brake actuator to increase in order to effect a brake application by acting on the pistons 34 of the actuator to force the metallic friction elements of the pistons against the composition friction rings 22.

In the operation of such a brake system, it has been found that when the system is first assembled, considerable air is present therein, but that after a very short period of operation, this air is substantially eliminated from the system and remains eliminated thereafter until connections are broken in the system for the purpose of making repairs or replacements. With the air thus eliminated from the system, it has been found that on application of the brake pedal there is a marked tendency for a momentary sudden friction ring engaging movement of the pistons which causes the brakes to grab momentarily with resulting discomfort to the passengers in the vehicle, and it has been found difficult to overcome this trouble without resorting to various cushioning devices in the system. When devices of the type to be described herein were applied properly to a brake system of this type, it was found that the above mentioned difficulty was entirely eliminated, without affecting satisfactory operation of the brake mechanism in other respects, the brake being entirely controllable when such a device or devices were added to the system.

In the operation of the system shown in Fig. 3, the pump 53 may be a gear pump, and although it is commonly considered that such pumps give a substantially constant flow of liquid, the flow is actually of a pulsating nature, and may under some conditions, cause excessive vibration or noise in the system. It was found during the operation of the system that damping mechanism of the type described herein could be connected in various ways in the discharge conduit 77 of the pump in order to overcome this difficulty.

Figure 6:
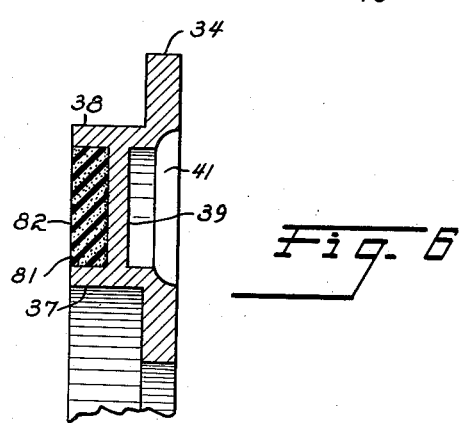
Fig. 6 is a cross-section of the piston of Fig. 5 taken along line 6—6 of Fig. 5.

During actual tests of the system shown in Fig. 3, it was found that damping mechanism constructed in accordance with the principles of the present invention could best be incorporated directly in the brake actuator 12, as will now be described. Referring to Figs. 5 and 6, it will be noted that a channel 81 is formed on the back side of each piston as shown, and in order to overcome the above described sudden brake operation caused by pressure pulsations in the liquid during initial application of the brakes, arcuate pieces of cellular sponge rubber 82 were inserted in this channel as shown, being adhesively or otherwise secured to the back side of the partition 39, and extending outwardly in the channels substantially to the end of the piston in order to nearly fill the pressure chamber formed between the piston and cylinder with the piston completely retracted. In view of the presence of the ports 40, 43, and 46 in the piston wall 39, four pieces of cellular sponge rubber 82 were used and positioned so as to prevent any interference with the functioning of these ports and the anchor pins. The cellular sponge rubber was of the cellular type made of resilient rubber-like material and having therein a multiplicity of adjacent separately sealed cells which were filled with a gas such as nitrogen. Although the materials are referred to herein as being of cellular sponge rubber, it is to be clearly understood that the term "cellular sponge rubber" is intended to mean the cellular type above referred to and to include both the natural and the synthetic rubbers, as well as certain other plastic materials which adapt themselves to the formation of this type of article.

When the brake pedal 70 was operated to effect a brake application, it resulted, as heretofore described, in a sudden initial pressure impulse of liquid being applied to the pressure chamber of brake actuator. The cellular sponge rubber installed in the pistons as above described, served to absorb this impulse and prevent entirely any tendency for the brake to grab, which had previously occurred when the cellular sponge rubber was not used in the brake actuators. It should be noted in this connection, that the use of a cellular sponge rubber in the actuators for this purpose provides a means for introducing a definite amount of a compressible gas in the liquid circulating system, and that since this gas is sealed in the cells of the sponge rubber, there is no tendency for this gas to be absorbed by the circulating cooling liquid in order to change the effectiveness of the damping means. Since a large surface of the sponge rubber is exposed to the action of the liquid, and since the sponge rubber of this type is readily compressible and returns to its initial shape when the pressure in the system is relieved, the cellular sponge rubber is extremely effective in damping out the above referred to liquid pulsations, as it has little inertia and responds almost instantaneously to variations of pressure in the liquid in the brake actuators.

As indicated heretofore, a similar damping device containing cellular sponge rubber was found to be very effective in damping out pulsations caused by the operation of the pump 53, and to this end a damping device 83 was connected to the discharge line 77 of Fig. 3 adjacent the outlet of the pump.

Although the invention has been illustrated and described in considerable detail, it is to be understood that the same is not to be considered as limited thereby, and that other embodiments of the invention may suggest themselves to those skilled in the art. Reference will be had, therefore, to the appended claims for a definition of the limits of the invention.

What is claimed is:

1. The combination with a hydraulic actuator having a cylinder, a piston slidably mounted therein and having a brake friction element directly connected thereto and movable thereby, said piston and cylinder forming a pressure chamber therebetween, and a port in the cylinder for connecting the pressure chamber to a source of liquid under pressure, of impulse damping means carried by and secured to the piston for absorbing sudden liquid pressure impulses in the pressure chamber, said damping means being formed of resilient cellular sponge rubber and being secured to the piston for movement therewith.

2. The combination as set forth in claim 1, wherein the sponge rubber damping means substantially fills said pressure chamber when the piston is retracted in the cylinder.

References Cited in the file of this patent

UNITED STATES PATENTS

| | | |
|---|---|---|
| 1,886,712 | Messier | Nov. 8, 1932 |
| 2,014,630 | O'Brien et al. | Sept. 17, 1935 |
| 2,174,635 | Linderman | Oct. 3, 1939 |
| 2,406,304 | Levy | Aug. 20, 1946 |
| 2,495,693 | Byrd et al. | Jan. 31, 1950 |
| 2,701,583 | Rux | Feb. 8, 1955 |

FOREIGN PATENTS

| | | |
|---|---|---|
| 541,445 | France | May 2, 1922 |
| 17,403 | Great Britain | Apr. 27, 1897 |